United States Patent
Fotta et al.

(10) Patent No.: US 7,158,630 B2
(45) Date of Patent: Jan. 2, 2007

(54) DO-NOT-CALL COMPLIANCE MANAGEMENT FOR PREDICTIVE DIALER CALL CENTERS

(75) Inventors: Keith A. Fotta, Duxbury, MA (US); Richard P. Boudrieau, Duxbury, MA (US)

(73) Assignee: Gryphon Networks, Corp., Norwood, MA (US)

( * ) Notice: Subject to any disclaimer, the term of this patent is extended or adjusted under 35 U.S.C. 154(b) by 296 days.

(21) Appl. No.: 10/338,518

(22) Filed: Jan. 8, 2003

(65) Prior Publication Data

US 2005/0074114 A1 Apr. 7, 2005

Related U.S. Application Data

(60) Provisional application No. 60/402,762, filed on Aug. 12, 2002, provisional application No. 60/389,514, filed on Jun. 18, 2002.

(51) Int. Cl.
- *H04M 3/00* (2006.01)
- *H04M 5/00* (2006.01)
- *H04M 1/64* (2006.01)
- *H04M 7/00* (2006.01)

(52) U.S. Cl. .................. 379/266.08; 379/69; 379/196; 379/230

(58) Field of Classification Search ................ 379/196, 379/210.02, 266.08, 69, 230
See application file for complete search history.

(56) References Cited

U.S. PATENT DOCUMENTS

| | | | |
|---|---|---|---|
| 4,625,081 A | 11/1986 | Lotito et al. | 379/88 |
| 4,866,762 A | 9/1989 | Pintar | 379/200 |
| 5,200,995 A | 4/1993 | Gaukel et al. | 379/200 |
| 5,355,403 A | 10/1994 | Richardson et al. | 379/88 |
| 5,448,633 A | 9/1995 | Jamaleddin et al. | 379/201 |
| 5,471,524 A | 11/1995 | Colvin et al. | 379/200 |
| 5,528,677 A | 6/1996 | Butler et al. | 379/196 |
| 5,539,812 A | 7/1996 | Kitchin et al. | 379/189 |
| 5,559,874 A | 9/1996 | Panosh | 379/189 |
| 5,579,318 A | 11/1996 | Reuss et al. | 370/94.2 |
| 5,655,013 A | 8/1997 | Gainsboro | 379/188 |
| 6,130,937 A | 10/2000 | Fotta | 379/200 |
| 6,198,814 B1 | 3/2001 | Gill | 379/266 |
| 6,236,722 B1 * | 5/2001 | Gilbert et al. | 379/230 |
| 6,330,317 B1 * | 12/2001 | Garfinkel | 379/196 |
| 6,549,619 B1 * | 4/2003 | Bell et al. | 379/210.02 |
| 6,567,504 B1 * | 5/2003 | Kercheval et al. | 379/69 |
| 2001/0033643 A1 | 10/2001 | Mulvey et al. | 379/196 |

* cited by examiner

*Primary Examiner*—Wing Chan
*Assistant Examiner*—Thjuan P. Knowlin
(74) *Attorney, Agent, or Firm*—Wilmer Cutler Pickering Hale & Dorr LLP (57) ABSTRACT

A mechanism and method for updating local call information databases for calls to be placed by predictive dialers deployed at different geographic locations within a communications network.

10 Claims, 9 Drawing Sheets

DO-NOT-CALL COMPLIANCE MANAGEMENT FOR PREDICTIVE DIALER CALL CENTERS

This application claims priority from U.S. Provisional Patent Application Ser. No. 60/389,514, filed Jun. 18, 2002, and U.S. Provisional Patent Application Ser. No. 60/402,762, filed Aug. 12, 2002, both of which are incorporated herein by reference.

BACKGROUND

The invention relates to generally to communications systems, and in particular, to systems that manage compliance with outgoing call regulations.

Recent telephone solicitation laws and regulations mandate that a consumer, who expresses a desire not to be solicited by telephone, not be called. By regulation, a business must maintain a list of telephone numbers for such consumers, known as a "do-not-call" (DNC) list, and take appropriate measures to ensure that outgoing calls to telephone numbers on a DNC list are somehow blocked. The DNC lists can include a list specific to a particular business, as well as state-wide, national and industry-imposed lists. Thus, DNC compliance management is a particularly critical and challenging issue for businesses that rely on telephone solicitation as a core marketing tool.

SUMMARY

In general, in ones aspect, the invention features a method of disseminating caller-related information in a do-not-all system that includes a plurality of predictive dialer systems each at a corresponding different one of a plurality of different locations, each of the plurality predictive dialer systems including an associated database system that is local to that predictive dialer system and that includes a do-not-call database. The method, which is implemented by a given one of the predictive dialer systems, includes receiving an update instruction that is of a first type or a second type, the first type being for blocking future calls to a specified telephone number and the second type being for removing a block on future calls to a specified telephone number associated; in response to receiving the local update instruction, concurrently sending first and second update notifications, wherein the first update notification is sent to the local database system and the second update notification is sent to another one of the plurality of predictive dialer systems that is located elsewhere from the given predictive dialer system; and in response to receiving the first notification at the database system associated with the given predictive dialer system, updating the do-not-call database included therein, wherein the second update notification is for causing an update of the do-not-call database at the other one of the plurality of predictive dialer systems.

Other embodiments include one or more of the following features. The method also includes, in response to receiving the local update instruction and before concurrently sending the first and second update notifications, verifying that a first token associated with the received update instruction requires that the other one of the predictive dialer systems be updated and wherein the second update notification includes a second token for indicating whether the other one of the predictive dialer systems needs to forward an update notification to yet another one of the predictive dialer systems. The first token is a count variable and the verifying involves decrementing the count variable and then confirming that the count variable is different from a predetermined value. The second token is the decremented value of the count variable. The method also includes, after receiving the update instruction and prior to sending the second update notification, retrieving from a configuration file that is local to the given predictive dialer system an address for the other predictive dialer system and wherein the sending of the second update notification is to the retrieved address. The method also includes either generating the update instruction locally to the given predictive dialer system or alternatively, received the update instruction from an entity that is remote from the given predictive dialer system.

In general, in another aspect, the invention provides methods and apparatus for processing call information for calls to be placed by predictive dialers deployed at different geographic locations within a communications networks The methods include (i) receiving call information for a number to be called by one of the predictive dialers; (ii) processing the call information to determine if the number is on a Do-Not-Call (DNC) list, a copy of which is maintained in association with each of the predictive dialers; (iii) if the number is determined not to be on the DNC list, determining if the number is to be added to the DNC list; and (iv) enabling an update of the DNC list copy associated each of the predictive dialers with information that includes the number so that each of the predictive dialers has access to the information in near real-time.

Particular implementations of the invention may provide one or more of the following advantages. The DNC compliance management solution provides call centers with the ability to comply automatically with consumer DNC laws. The solution's DNC server application software "plugs-in" to supported predictive dialers, and provides the predictive dialers with real-time access to the do-not-call status of each phone number, thus allowing the predictive dialers to dial only non-restricted telephone numbers. The DNC compliance management solution also provides the ability for any client's telemarketing professional to, at the request of a consumer, instantly restrict a phone number by pressing keys on their telephone keypad. When this action occurs, that telephone number is restricted for all other telemarketing professionals in the organization of that client, regardless of where they are located. State and federal updates to the DNC laws are updated nightly, and client-specific DNC-requests are updated in real-time.

Other features and advantages of the invention will be apparent from the following detailed description and from the claims.

DESCRIPTION OF DRAWINGS

Like reference numerals will be used to represent like elements.

DETAILED DESCRIPTION

Figure 1:
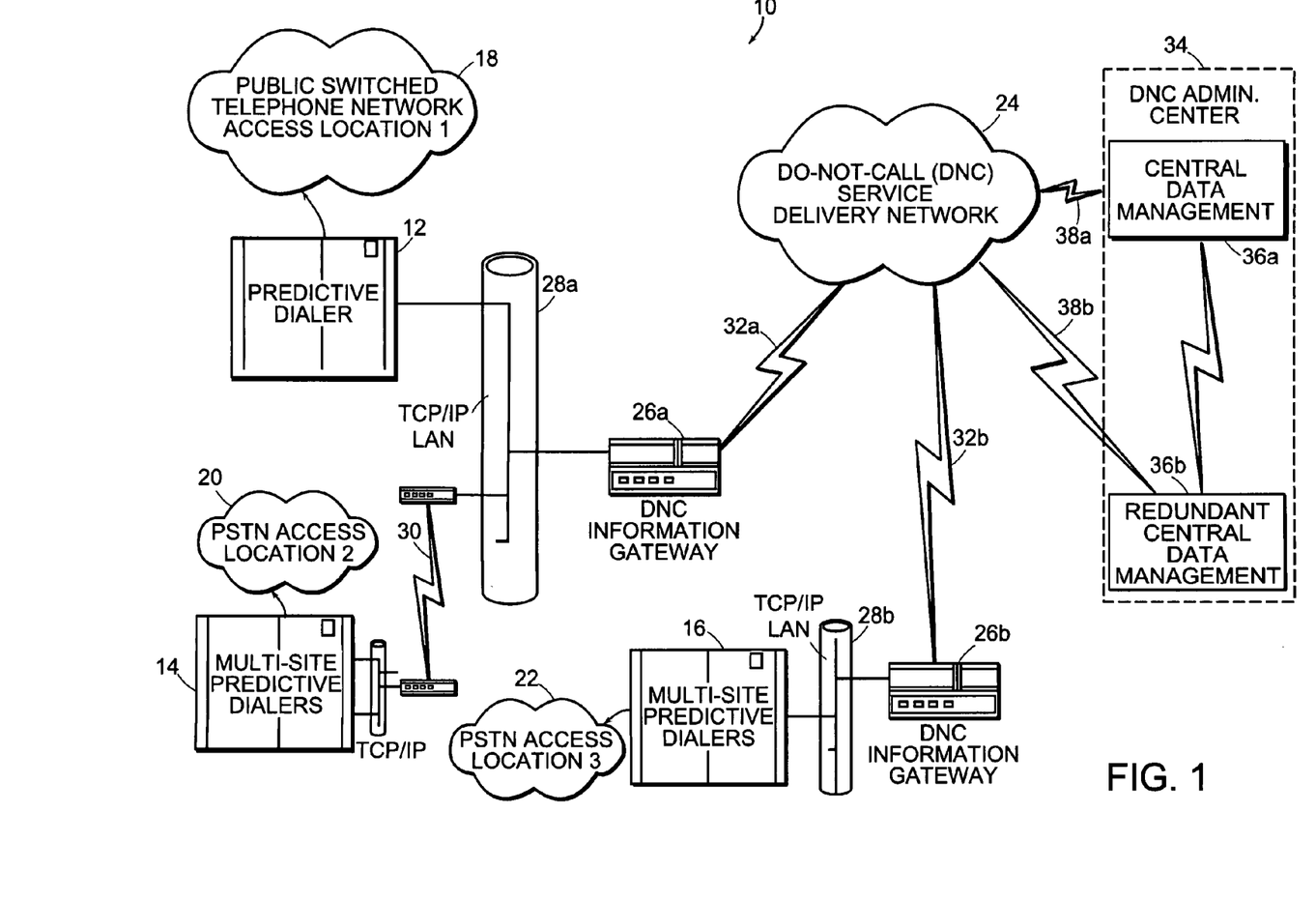
FIG. 1 is a block diagram of a communications network that supports a "Do-Not-Call" (DNC) compliance management infrastructure for predictive dialer call centers.

Referring to FIG. 1, a communications network 10 includes a plurality of predictive dialer arrangements 12, 14, and 16 coupled to a Public Switched Telephone Network (PSTN) at respective PSTN access locations 18, 20 and 22.

As is known in the relevant art, each predictive dialer in the predictive dialer arrangements is a system of outbound calling that dials without a caller (e.g., telemarketing agent) on the line. The predictive dialer dials a telephone number, listens and, when a live "hello" is detected, automatically transfers the call to an available agent. The predictive dialer typically places numerous calls simultaneously, checking each number for a live "hello" or for another call disposition. If the called number is busy, not answered or not working, the predictive dialer either discards or reschedules the call, then proceeds to dial another number. Predictive dialers cannot tolerate much delay, so the latency associated with any DNC call processing that is performed must be extremely low. Latency can be minimized by co-locating a client's predictive dialers and DNC call processing at given geographic locations, as shown in the figure.

Each of these predictive dialer arrangements is connected to a Do-Not-Call (DNC) information gateway that connects to a private DNC service delivery network 24 used by a DNC service provider to provide a DNC service. The predictive dialer arrangements are deployed at different geographic locations within the network. The different geographic locations correspond to different geographic office locations of a client (or customer) of the DNC service provider. The predictive dialer arrangements can vary from client location to client location. For example, the predictive dialer arrangement 12 can be single predictive dialer, the predictive dialer arrangement 14 can be a network of multisite predictive dialers interconnected by a data network of the client, and the predictive dialer arrangement 16 can be a network of multi-site predictive dialers interconnected by a network of the DNC service provider, as shown in the figure.

The predictive dialer 12 is coupled to a first DNC information gateway 26a via a TCP/IP Local Area Network (LAN) 28a The predictive dialer arrangement 14 is also connected to the first DNC information gateway 26a through the TCP/IP LAN 28a via a client data network connection 30. The predictive dialer arrangement 16 is connected to a second DNC information gateway 26b via a second TCP/IP LAN 28b. The DNC information gateways 26a and 26b are connected to the DNC service delivery network 24 via Wide Area Network (WAN) connections 32a and 32b, respectively.

Also connected to the DNC service delivery network 24 is a DNC Administrative Center 34, which includes a networked redundant pair of central data management systems 36a and 36b. The central data management systems 36a, 36b include central databases for storing DNC list data.

The systems 36a, 36b communicate with the DNC information gateways 26 over the DNC service delivery network 24 using TCP/IP connections 38a and 38b, respectively. The DNC Administrative Center 34 is responsible for reporting, billing, and keeping the DNC information gateways 26 up-to-date with the latest do-not-call data. The DNC Administrative Center 34 updates the gateways 26 on a nightly basis with any changes to state, federal or other applicable DNC lists that are not client-unique, as will be discussed in further detail later.

The DNC service delivery network 24 and DNC Administrator 34 are operated by the DNC service provider. The predictive dialer DNC service is provided by functionality included in the DNC information gateways 26, the DNC service delivery network 24 and the DNC Administrative Center 34.

Figure 2:
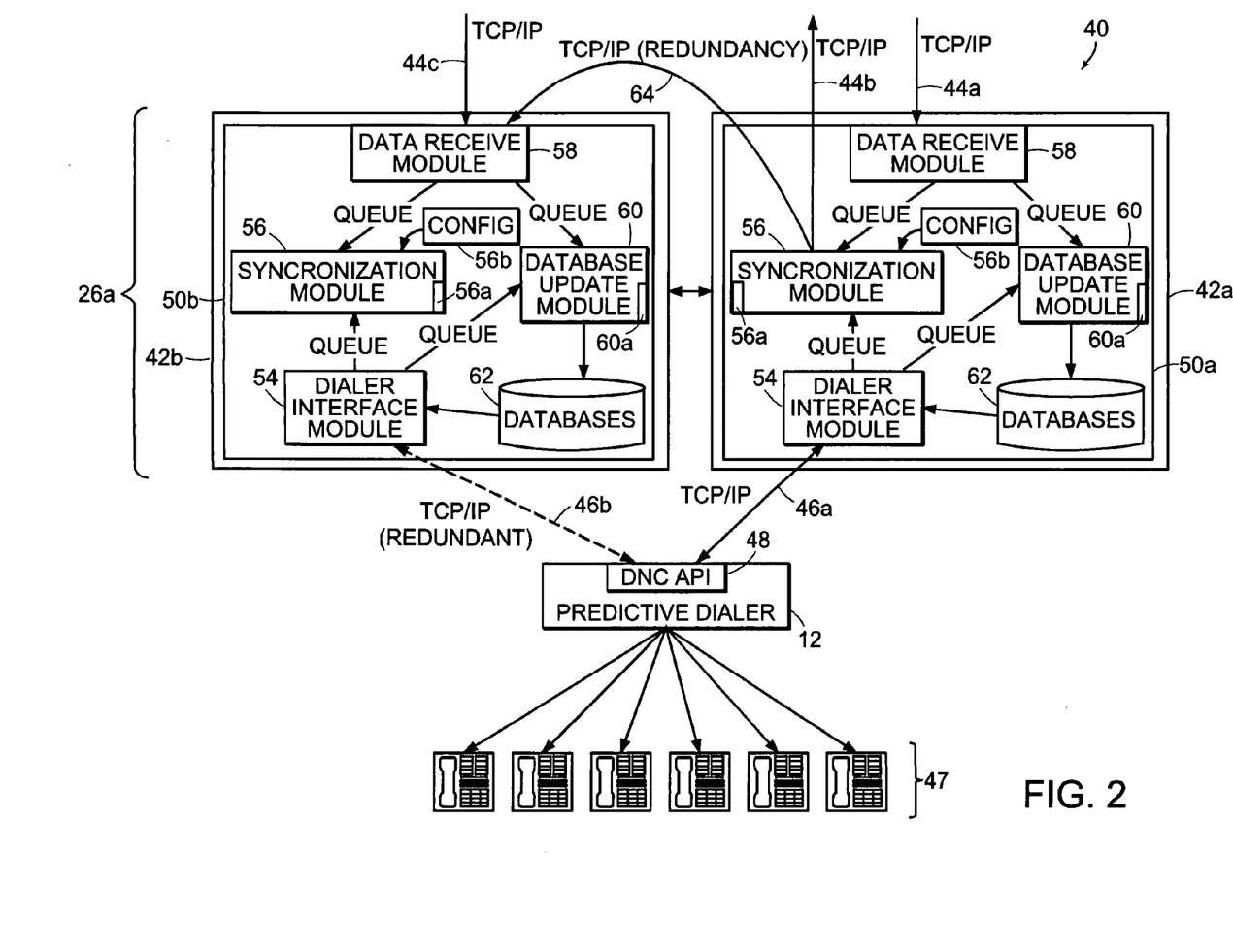
FIG. 2 is a block diagram of an exemplary predictive dialer call center that includes a pair of DNC servers that couple to a DNC service network.

Referring to FIG. 2, an exemplary predictive dialer call center 40 configured to utilize the DNC service is shown. The predictive dialer call center 40 includes one of the DNC information gateways, shown as gateway 26a, which includes two identical DNC servers 42a and 42b. The DNC servers 42 are coupled for redundancy, e.g. available for fail-over. The pair of DNC servers is connected to the DNC service delivery network 24 and communicates with the DNC service delivery network over TCP/IP connections 44a and 44b for server 42a, and TCP/IP connection 44c for server 42b. The servers 42 are coupled to a predictive dialer arrangement, shown as predictive dialer 12, as well. The DNC server 42a uses a TCP/IP connection 46a for communication exchanges with the predictive dialer 12. The redundant server 42b, in a fail-over capacity, uses a TCP/IP connection 46b for such communications. The predictive dialer 12 is coupled to a plurality of agent call systems, collectively agents 47, which are connected to the PSTN via at the access location 18 (FIG. 1).

The predictive dialer 12 includes an API (DNCAPI) 48 that provides a DNC interface between the predictive dialer 12 and the DNC servers 42. The DNC servers 42 can communicate with any predictive dialers equipped with the DNCAPI 48. The DNC servers 42 are responsible for processing DNC requests from predictive dialer 12, as well as other predictive dialers of the client, e.g., predictive dialers of arrangements 14 and 16 (from FIG. 1). The DNC Administrative Center 34 communicates with the DNC servers 42 over the network 24 (via connections 44a and 44c) to provide the DNC servers 42 with the latest updates to state and federal do-not-call lists, as discussed earlier.

Thus, each client call center location in the network 10 (FIG. 1), as exemplified by the call center shown in FIG. 2, includes two co-located DNC servers 42, which communicate over a TCP/IP LAN with the call center's predictive dialer(s). Real-time DNC service is provided to client callers at the given location using dedicated on-location hardware and software.

Examples of the type of hardware that is co-located at each client location include: two servers (for DNC servers 42a, 42b), e.g., Sun Netra-family servers or the like; one router, such as a Cisco 1600/1700/2600 family router; and a hub. In one configuration, the equipment requires two 10BaseT (or 100BaseT) LAN connections to the client's local area network. This connection must have reliable connectivity to the predictive dialer network(s). The TCP/IP configuration requires 3 IP addresses that are all routable to the predictive dialers. The DNC servers are dual Ethernet equipped. A primary interface attaches to the client LAN, and a secondary interface attaches to the hub (or equivalent) provided as part of DNC service provider's equipment.

The router would interconnect the DNC server to the secure DNC service delivery network 24. Two types of WAN connectivity to the DNC service delivery network are supported: dedicated frame-relay, e.g., 56 K DDS or 128 K FT1; and VPN/IPSEC tunnels. If VPN/IPSEC connectivity is chosen by the client, the DNC service provider will require an additional IP address that is Internet routable and allows IPSEC tunneling protocols to pass through to DNC service provider's ISPs.

All client DNC service transactions are handled locally by the DNC servers. The WAN connectivity is used by the DNC service provider to route urgent Do-Not-Call updates from the DNC Administrative Center 34 which can include other predictive dialer locations for the same customer or client.

A system of software that resides on each DNC server 42 is referred to herein as the Rapid Data Dispersal System (RDDS), indicated by reference numerals 50a and 50b for DNC servers 42a and 42b, respectively. The RDDS 50 is architected to ensure that changes to do-not-call data are quickly and efficiently transferred to all of a client organization's call centers so that no member of that organization violates a do-not-call law. Because of the high-speed nature of predictive dialers, it is essential that the DNC server respond almost instantaneously to predictive dialer queries while ensuring accuracy. The RDDS architecture is designed to meet this goal as well.

Still referring to FIG. 2, and, in particular, the RDDS 50a for illustrative purposes, the RDDS 50a includes four software modules: a dialer interface module 54; a synchronization module 56; a data receive module 58; and a data update module 60. The RDDS further includes do-not-call databases 62.

The dialer interface module 54 processes queries from predictive dialers, such as telephone number lookups, add requests, and delete requests. One instance of this dialer interface module exists for each connection to a predictive dialer. The dialer interface module 54 may read from the do-not-all databases 62, but does not write to them. When processing a telephone number lookup request, the dialer interface module 54 reads the do-not-call status from the databases 62 and returns this information to the predictive dialer. When processing a telephone number add or delete request, the dialer interface module 54 does not access the databases 62 at all. Instead, it adds the request to two queues—a database update queue 60a and a synchronization queue 56a. For security, the dialer interface module 54 validates the IP address for the source of the transaction.

The queues 56a and 60a used by the synchronization and database update modules are FIFOs (i.e., the data is processed in the same order in which it is received) with file system persistence, which means that if there were a power failure that caused a server to reboot, the queue and any data it contains would remain intact.

The format of the data in the two queues (the database update queue and the synchronization queue) is a text string of eight data elements, each separated by pipe symbols (|). These eight data elements, in order, are:

1) Priority
2) Hop Count
3) Originating IP Address (in hex format)
4) Client key
5) Database name
6) Function code (1=check, 2=add, 3=delete)
7) Phone number (must be 10 digits)
8) Reserved An example queue record is as follows:

5|3|0A000005|1000|dma|2|7815551212|0

The database update module 60 is responsible for adding telephone numbers to and deleting telephone numbers from DNC lists in the databases 62 of the DNC server on which it resides. Only one instance of this module may be running per DNC server to ensure that no more than one process writes to a database at a given time. The database update module 60 reads transactions from the database update queue, which is filled by the dialer interface module 54 and data receive module 58, and writes the changes directly to the appropriate databases.

The synchronization module 56 handles the transfer of telephone number add and delete requests to other DNC servers in the network 10 for the same client. For example, if a client telemarketing organization has offices in Miami, Boston, and Seattle, and a telemarketing professional in Seattle adds a telephone number to the organization's DNC list, this information is transferred by the DNC server 42a in Seattle to both of the DNC servers 42a, 42b in Miami and Boston (via connection 44b), and as well as it's own redundant DNC server 42b in Seattle (via a TCP/IP connection 64). The synchronization module 56 reads transactions from the synchronization queue, which is filled by the dialer interface module 54 and the data receive module 58, determines which remote machine(s) the transaction must be transferred to, and does the transfer via TCP/IP to the data receive modules on the remote machines.

When the synchronization module 56 receives a transaction, it examines that transaction for an indication of a certain number of "hops" or hop count. A hop count of each transaction, initialized for a value indicative of the total number of synchronization modules in the client's DNC set-up, is decremented by one each time it is received by a synchronization module. Once the hop count reaches a value of zero, the transaction record is prevented from being further transferred. This functionality ensures that a transaction cannot "bounce around" infinitely between multiple synchronization modules.

There is a configuration file 56b for each synchronization module 56. It contains the number of other call centers that exist within that company's network and the IP addresses of one of those other call centers (or alternatively the IP addresses of all of the other call centers). For each site for which it maintains IP addresses, it has the IP address for each of the two servers (the primary server and the secondary server). Thus, it gives the local call center that ability to use the secondary IP address if communication cannot be achieved with the primary IP address. That is, if the first server at the remote site is unreachable, the synchronization module will try to send its update to the secondary server. When the secondary server receives the update, it will in turn try to forward it to the primary server.

The data receive module 58 receives telephone number add/delete transactions over TCP/IP connection 44a from remote synchronization modules, or from the DNC Administrative Center 34, and adds these transactions to the database update queue.

How the RDDS works can be more clearly appreciated with a specific example. As noted above, each synchronization module is responsible for updating a certain group of other synchronization modules, as defined in the configuration file on its local machine. Assume in this example that each synchronization module is responsible for notifying only one other remote system. In that case, when an add or delete occurs, the synchronization module establishes a hop count variable that is equal to that total number of call centers in the system, decrements that hop count variable, and then sends the notification of the change along with the decremented variable to the IP address of the other call center for which it is responsible (which information is contained in its configuration file). It also sends the update notification to a synchronization server in the DNC Administrative Center. That synchronization forwards the update to the IVR databases and other non-call center databases that need to be updated (see discussion below about IVR systems).

When the notification is received at the other call center, the data receive module places it on the synchronization queue for the synchronization module and on the update queue for the update module. When the synchronization module gets to that notification, it decrements the hop count variable and checks to see if it is zero. If it is not zero, indicating that not all call centers have been notified of the update, it then sends the decremented hop count variable along with the notification to another call center as identified in its local configuration file.

This process continues until the hop count reaches zero, indicating that all call centers have been notified. At that point, the synchronization module that holds the zero value hop count discards the notification and thus does not forward it to any other call centers. As should be apparent, the purpose of the hop count mechanism is to ensure that an endless loop of updates never occurs, where the same update gets passed back and forth between two or more synchronization modules.

In the case that a synchronization module can not reach any primary or secondary servers at the next call center, it writes the update to a "requeue file" on its local machine, and sends out a message, which immediately notifies a technician that there is a network problem. The technician can then fix the problem and run a utility to re-add the failed updates to the synchronization queue to be reprocessed.

Though it was assumed in the example just given that a synchronization module was responsible for sending the received notification to only one other DNC gateway, it could instead be responsible for sending that notification to "n" other servers (where n is an integer greater than one), all of which are identified in the local configuration file. In that case, the hop count would be used in a similar manner to prevent and endless loop from occurring.

The DNCAPI 48 is a 'C' library that provides real-time access to the DNC service. It provides a DNC interface to predictive dialers, thus allowing predictive dialer manufacturers to integrate the DNC service into their predictive dialers. The DNCAPI 48 allows a predictive dialer application to: (i) open one or more connections to the DNC service; (ii) perform real-time lookups of telephone numbers to determine their DNC status; (iii) add phone numbers to the DNC databases 62; (iv) remove telephone numbers from the DNC databases 62; and (v) close connections to the DNC service. The DNCAPI 48 can be implemented to support a variety of different operating systems, such as Windows NT, Solaris, Linux, to name a few.

Functions of the DNCAPI 48 include the following: 'DNC_connect'; 'DNC_disconnect'; 'DNC_initialize'; 'DNC_unitialize'; 'DNC_request'. A description of each function follows.

The DNC_connect function takes the form 'DWORD DNC_connect(DNC_HANDLE *aHandle);'. The DNC_connect function establishes a TCP/IP connection to the DNC server 42a, and returns a valid DNC handle on success. The DNC handle may then be used in DNC_request function calls, for the purpose of checking the DNC status of telephone numbers. The connections are thread safe, that is, two or more threads are allowed to make simultaneous DNC queries using the same handle, but these requests will be queued and executed one at a time by the DNCAPI. The parameters include 'aHandle', which is a handle to the DNC connection (output parameters). The return values include the following: SUCCESS; DNCAPI_ERROR_NOT_INITIALIZED; DNCAPI_MAX_HANDLES_REACHED; DNCAPI_ERROR_CREATING_SEMAPHORE; SOCKET_INVALID_HOST; and SOCKET_CONNECT_ERROR.

By making multiple calls to this function, multiple connections to the do-not-call service may be established. In this case, multiple threads may make simultaneous calls to the DNC server, and they will not be queued by the DNCAPI.

The DNC_disconnect function takes the form 'DWORD DNC_disconnect(DNC_HANDLE aHandle);'. This function destroys the specified connection to the DNC server. The parameters include 'aHandle', which is the handle to the DNC connection to be destroyed. The return values include the following: SUCCESS; and DNCAPI_ERROR_NOT_INITIALIZED.

The DNC_initialize function takes the following form:

```
DWORD DNC_initialize(
    char *ip_addr,
    int port,
    DNC_STATUS default_dnc_response);
```

This function initializes the DNCAPI. It must be called before any other DNCAPI functions. The parameters include: 'ip_addr'; port and default_dnc_response. The 'ip_addr' parameter specifies the IP address of the DNC service. The port parameter specifies the TCP/IP port number of the DNC service. The ip_addr and port information are provided to the calling application by the DNC service provider. The default_dnc_response parameter specifies the default status to be returned to the calling application in the event that there is an error in determining the DNC status of a telephone number. The return values include the following: SUCCESS; DNCAPI_ERROR_INITIALIZING; and DNCAPI_ERROR_ALREADY_INITIALIZED.

The DNC_request function is formatted as follows:

```
DWORD DNC_request(
    DNC_HANDLE aHandle,
    char *client_key,
    char *campaign_key,
    char *user_key,
    DNC_FN fn_code,
    char *phonenum,
    int ms_timeout,
    DNC_STATUS *response);
```

This function makes a DNC request to the DNC server 42a. The parameters include the following: 'aHandle'; 'client_key'; 'campaign_key'; 'user_key'; 'fc_code'; 'phonenum'; 'timeout'; and 'response'. The 'ahandle' parameter specifies the handle to the connection to the do-not-call server. The 'client_key' parameter specifies the ID of the client (user of the DNC service). The 'campaign_key' parameter provides the ID of the telemarketing campaign, if used. The 'user_key' provides the ID of the client caller making the call. The function code 'fn_code' parameter specifies the type of operation being performed. The valid function codes are: 'DNC_FN_CHECK', which checks the telephone number for it's DNC status; 'DNC_FN_ADD', which adds the telephone number to the DNC database; and 'DNC_FN_REMOVE', which serves to remove the telephone number from the DNC databases 62. The 'phonenum' parameter specifies the-telephone number-being checked. The 'timeout' parameter specifies a maximum amount of time (in ms) allowed for a query. The 'response' parameter specifies the response from the DNC server.

For DNC_FN_CHECK, the valid responses are: 'DNC_STATUS_OK', indicating that a telephone number can be dialed; and 'DNC_STATUS_RESTRICTED', indicating that the telephone number is restricted and should not be dialed. The return values include the following: SUCCESS; DNCAPI_ERROR_NOT_INITIALIZED; DNCAPI_ERROR_TIMEOUT; SOCKET_RECV_ERROR; and SOCKET_WRITE_ERROR.

The DNC_request function is a synchronous function. It will not return until the query has completed or an error occurs. The timeout parameter is provided to cause the function to return with the DNCAPI_ERROR_TIMEOUT error when the query takes longer than the specified number of milliseconds. This function is also thread safe. Thus, two or more threads are allowed to make simultaneous calls to DNC_request using the same handle, but these requests will be queued and executed one at a time by the API.

The DNC_uninitialize function is of the form 'DWORD DNC_uninitialize( );'.

It un-initializes the DNCAPI. The function accepts no parameters. The return value is 'SUCCESS'. Once this function is called, the DNCAPI cannot be used again until it is re-initialized using the DNC_initialize function.

The function 'error_msg' takes the following form:

```
char *error_msg(
    DWORD errnum);
```

The parameter 'errnum' specifies an error code, typically, a code received from one of the DNCAPI functions. It returns an error message that is associated with the specified error code. On success, the return value is a pointer to a string containing the error message. On failure, the return value is an empty string. This function may be contained in a separate library. If so, the calling application must be linked to that library.

Figure 3:
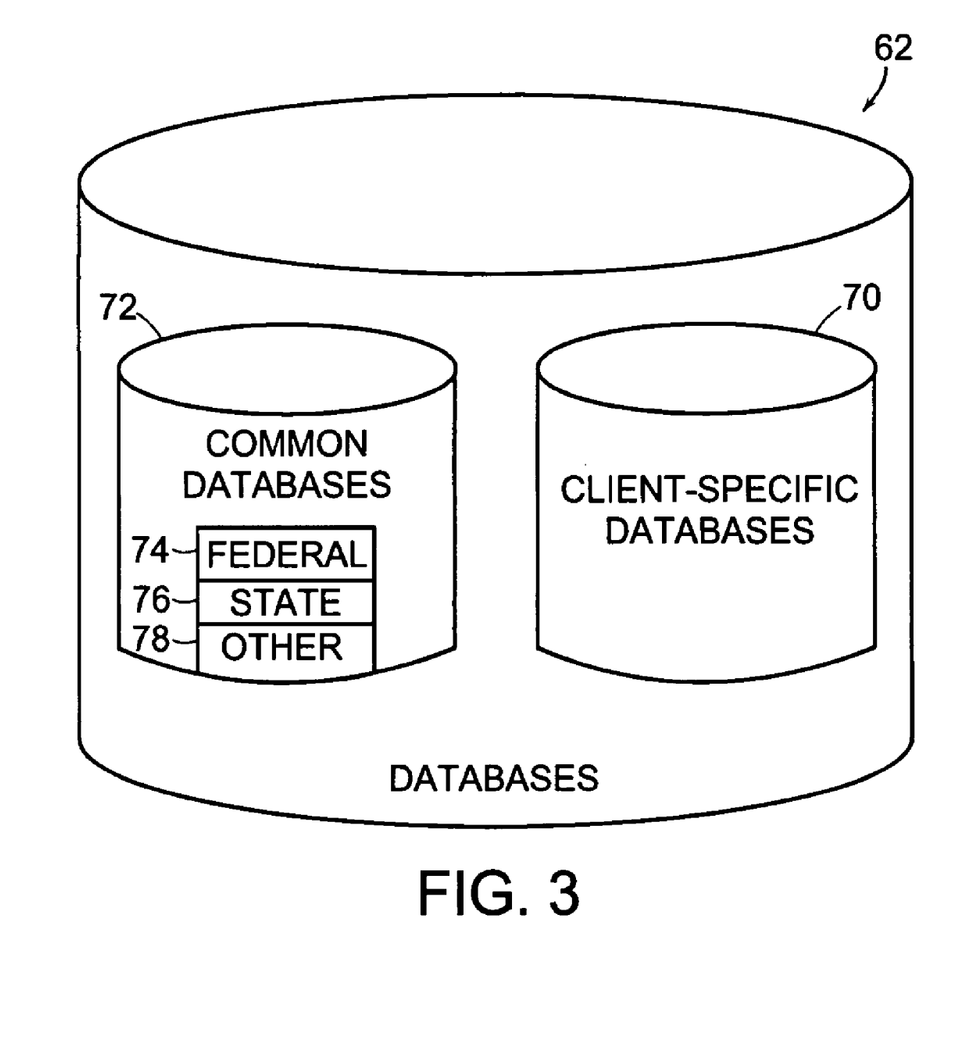
FIG. 3 is a high-level diagram of the databases of the DNC management system (shown in FIG. 2).

Referring to FIG. 3, the databases 62 maintained on the servers 42 include two types of DNC databases: client-specific databases 70 and common-databases 72. The client-specific databases 70 store DNC lists for a specific client such as a telemarketing organization. Usually this data comes from called parties (e.g., consumers) who indicate to a client caller (e.g., telemarketing professional) that they do not wish to receive any more calls from this client. The common databases 72 store lists which are imposed by governmental agencies, and which would apply to all client callers, regardless of organization, such as federal lists 74 and state lists 76. Other applicable common lists, indicated by reference numeral 78, may be included as well.

Figure 4:
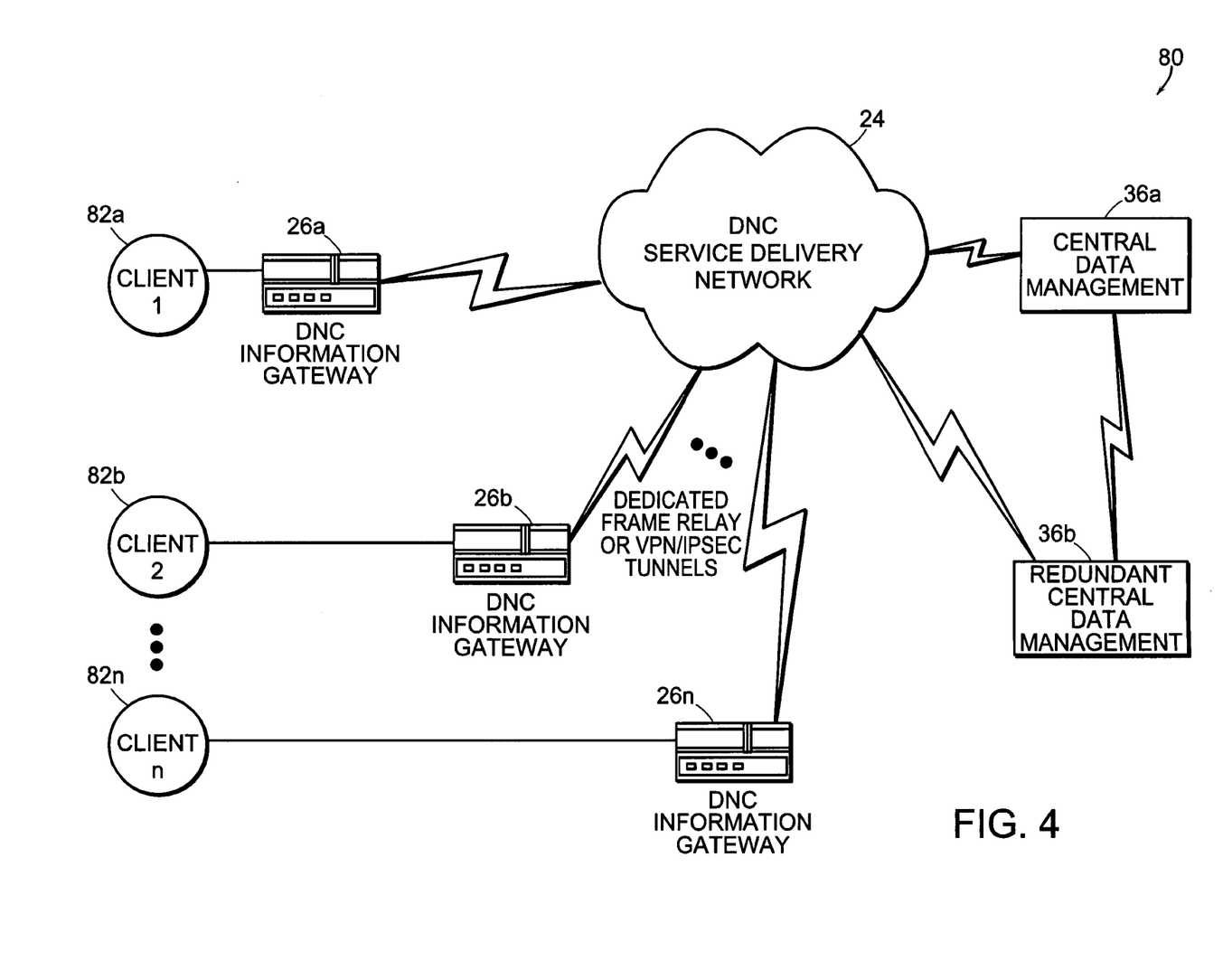
FIG. 4 is a block diagram of a communications network that supports DNC compliance management infrastructure that provides DNC service to multiple clients.

FIG. 4 is a network architecture diagram of a network 80 that illustrates how the DNC compliance management infrastructure may be scaled for additional clients. A plurality of clients 82a, 82b, . . . 82n, each having equipment deployed at various geographic locations, may be connected to the DNC service delivery network 24 through at least one DNC information gateway, that is, a corresponding gateway 26a, 26b, . . . 26n, respectively, which maintains common databases as well as databases unique to that client, as described earlier.

Figure 5:
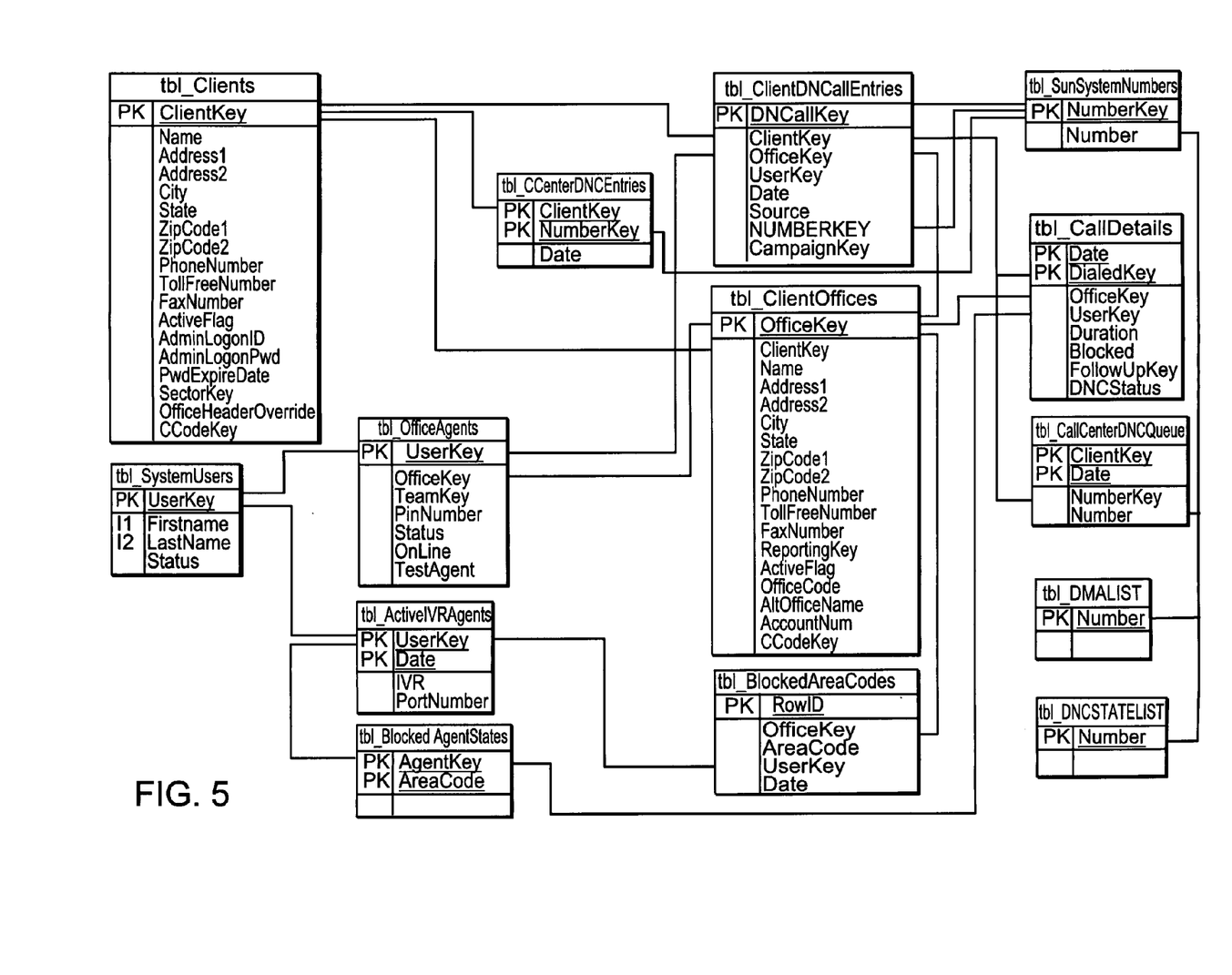
FIG. 5 is a block diagram of a centralized DNC database that stores and manages DNC data for multiple clients.

FIG. 5 shows the internal organization of the Administrative Center's centralized data base, which stores client and common information for each client of the DNC service. DNC clients that are entered into the system for processing calls, either through dial-up voice IVR sessions, a predictive dialer or both, are assigned a unique client key that identifies that client to the DNC gateways and servers. Individual offices within a client are also assigned a unique office key when they are loaded, including the assigned client key identifying the individual office to the DNC gateways and servers.

Agents making prospecting calls on behalf of the client are assigned a pin number that requires it to be unique only within a single client. A user key is then generated for that agent and is unique within the DNC server's centralized database across all clients. This client key, office key, and user key relationship, provide a great deal of flexibility within the system for reporting, agent and office relocations, and fail-over between IVR gateways.

FIG. 5 shows the table organization of the data structure in which the do-not-call numbers are stored. The tables shown are as follows:

tbl_Clients: a table of all clients using the system including relevant information about each client.

tbl_SystemUsers: a table of all individuals users of the system whether they be agents or system administrators tbl_OfficeAgents: a table of all brokers. This table indicates among other things whether the agent is part of a team, whether he/she is active, and whether he/she is online.

tbl_ActiveIVRAgents: a table of all agents currently signed on through the IVRs.

tbl_BlockedAgentStates: this table enables one to restrict certain agents from certain states identified in the table.

tbl_BlockedAreaCodes: this table enables one to restrict certain agents from certain area codes.

tbl_ClientOffices: these tables are for the offices that are assigned to a given client tbl_CCenterDNCEntries: this table lists the numbers which are blocked for a given client/call center.

tbl_ClientDNCCallEntries: this table contains the do-not-call numbers.

tbl_SunSystemNumbers: this table maps each ten digit number to a key of a smaller size. Using the number key instead of the ten-digit number reduces the amount of storage space that is required in the database to store the information.

tbl_CallDetails: this table stores details about the calls that are mode for the purpose of generating reports.

tbl_CallCenterDNCQueue: this table stores the database changes that need to be sent out to the clients (e.g. predictive dialers) to update their local databases. The clients poll this table every minutes to retrieve what might be relevant to them.

tbl_DMALIST: this table stores is the federal list of do-not-call numbers.

tbl_DNCSTATELIST: this table stores the state lists of do-not-all numbers.

An important feature of this DNC service architecture is its ability to integrate predictive dialer applications with other telemarketing applications, such as a dial-up interactive voice response (IVR) based DNC application. As a result, if an organization has predictive dialer call centers in some locations, but also has telemarketing professionals in other locations using the dial-up IVR-based applications, telephone numbers restricted in one location are automatically restricted in the others regardless of the type of application being used.

Figure 6:
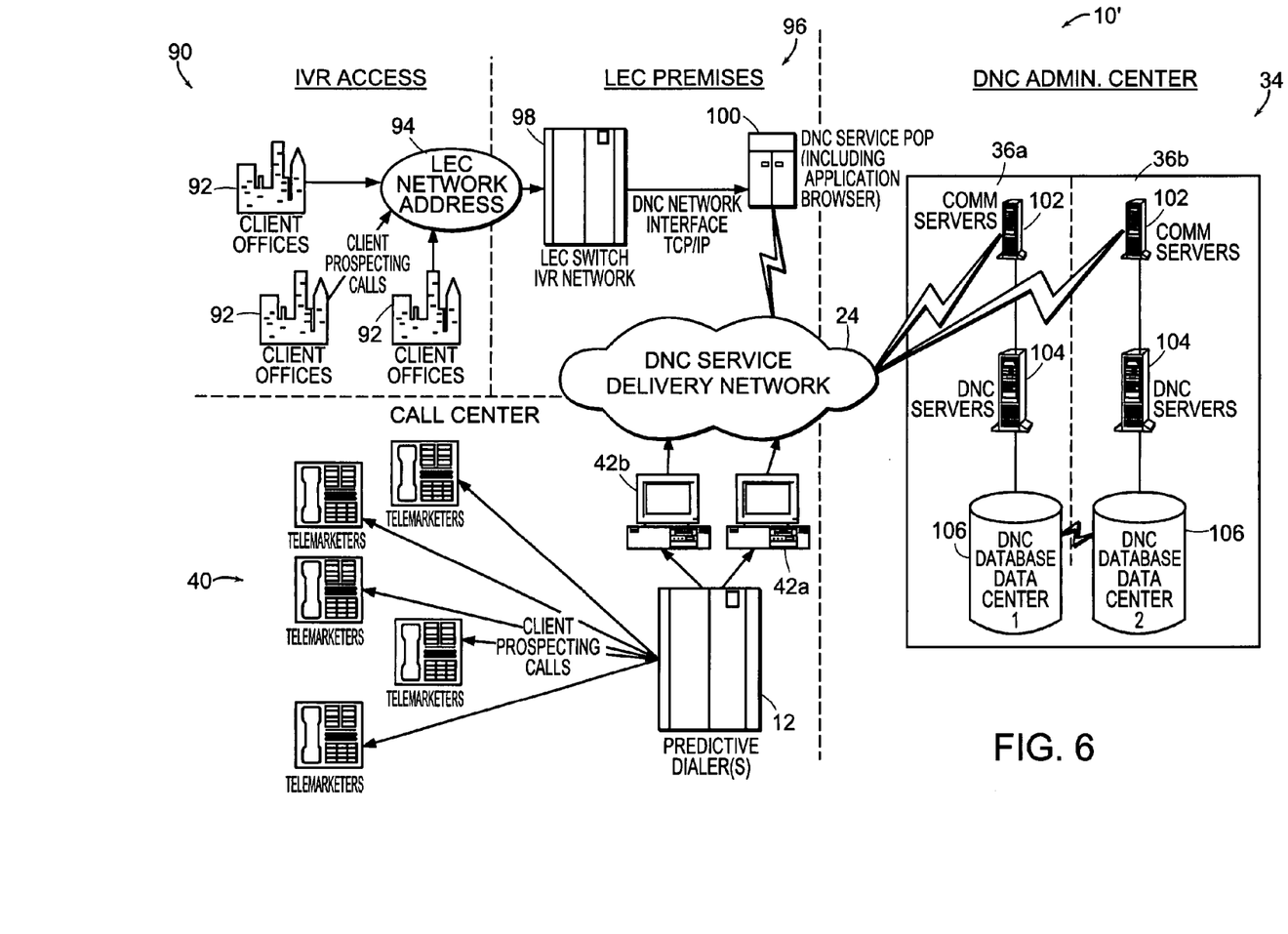
FIG. 6 is a block diagram of a network that supports a DNC management infrastructure for a client that uses both interactive voice response (IVR) systems as well as predictive dialer call centers.

Thus, and referring to FIG. 6, in addition to the predictive dialer call centers, a network, indicated here as network 10', can include IVR applications that support DNC call processing as well. The DNC IVR application may be used by a client caller (e.g., agent, telemarketer) working alone or as part of a call center.

As shown in FIG. 6, the network 10' can be partitioned (as indicated by the dashed lines) into the following: an IVR access 90, in which multiple client offices 92 are coupled to an LEC (Local Exchange Carrier) network access point 94; LEC premises 96 in which an LEC switch/IVR network 98 is co-located with a DNC Service Point-of-Presence (POP) 100; a predictive dialer call center 40 (as described earlier with reference to FIG. 2); and the DNC Administrative Center 34 of the DNC service provider. The LEC premises 96, call center 40 and DNC Administrative Center 34 are each connected to the DNC service delivery network 24, as shown.

In this figure, further details of the DNC Administrative Center 34 are shown. Each of the central data management systems 36 includes a network of one or more communication servers 102, one or more DNC servers 104 and a DNC database data center 106. The communications server(s) 102 act as a front-end to the system 36 and thus pass communications between the DNC service delivery network 24 and the back-end call processing DNC servers 104 and databases data center 106.

Figure 7:
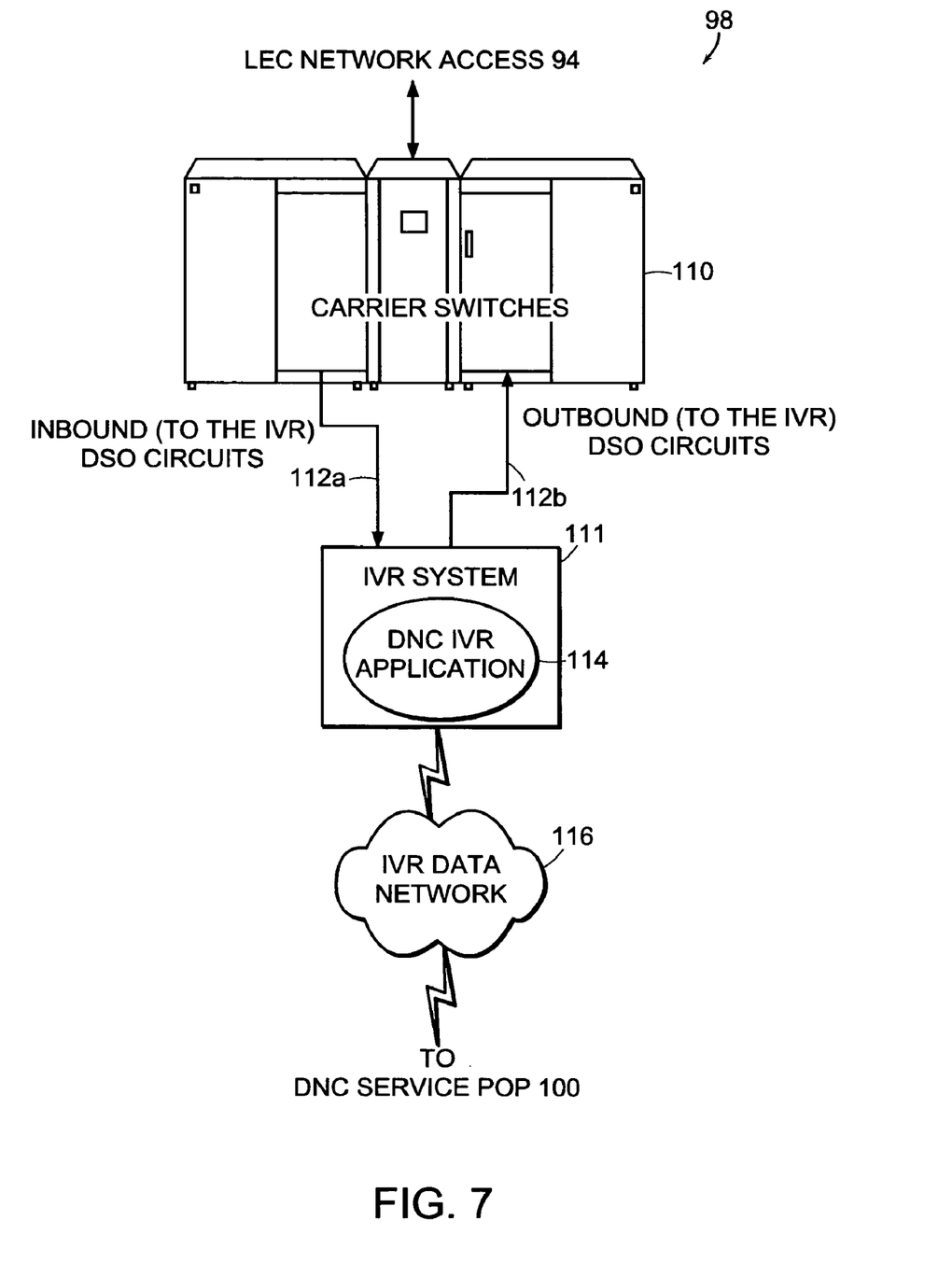
FIG. 7 is a block diagram of the Local Exchange Carrier (LEC) switch/IVR network (shown in FIG. 6).

Referring to FIG. 7, the LEC switch/IVR network 98 includes carrier switches 110, which are coupled to the LEC Network Access 94 (FIG. 6), as well as an IVR system 111 via inbound (to the IVR system) PRI T1's circuits 112a and outbound (from the IVR system) PRI T1's circuits 112b. The IVR system includes a DNC IVR application 114. The IVR system 111 is connected to the DNC Service POP 100 (from FIG. 6) via an IVR data network provided by dedicated routers over a frame relay network for speed and reliability 116.

Figure 8:
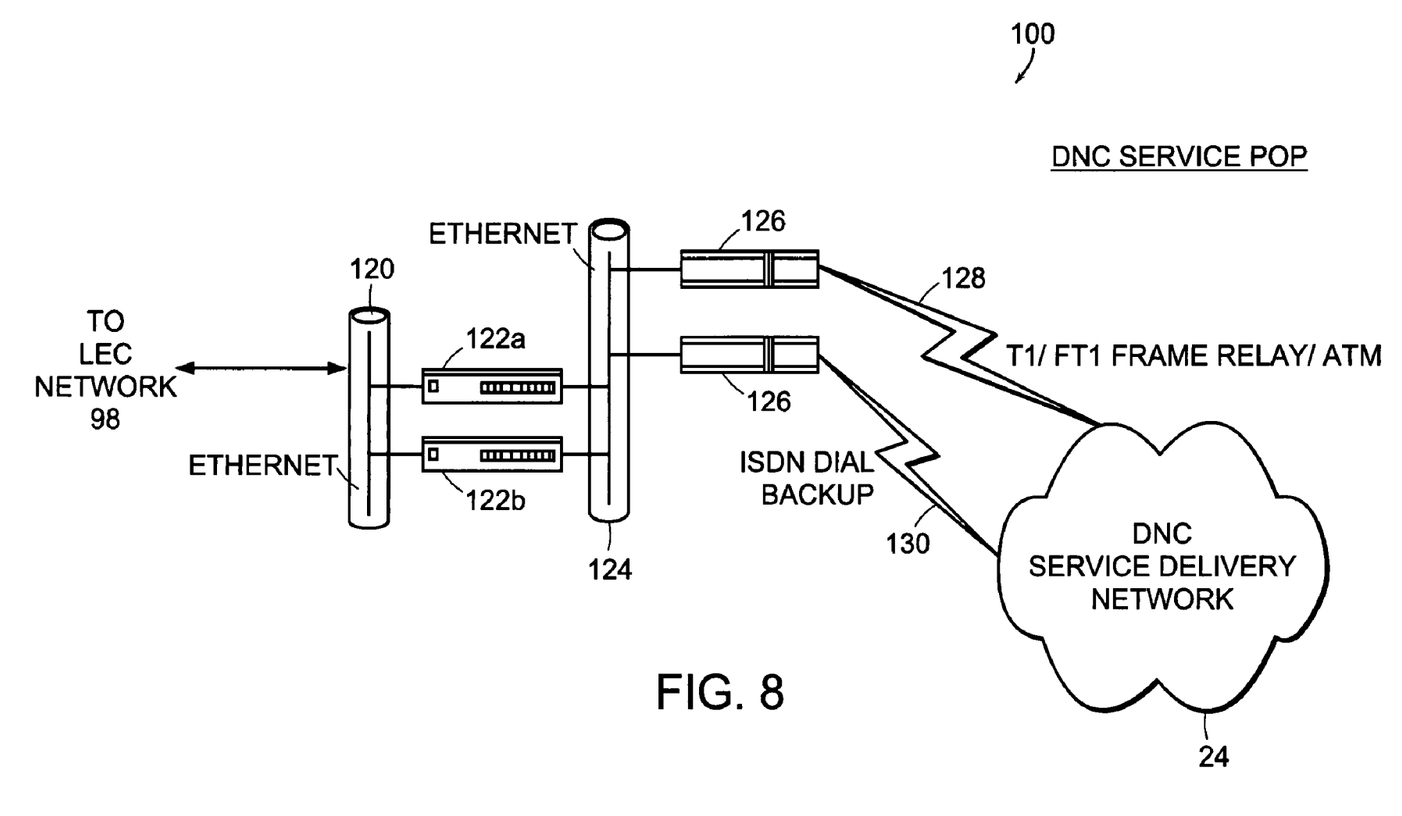
FIG. 8 is a block diagram of the DNC service Point-of-Presence (POP) (shown in FIG. 6).

Referring to FIG. 8, the DNC Service POP 100, which is coupled to an Ethernet segment in the LEC network 98 via another Ethernet segment 120, includes two DNC gateways 122a, 122b, which are coupled to the DNC service delivery network 24 an Ethernet LAN 124 and routers 126. Both routers are connected to the network 24 via a T1/F1 Frame Relay ATM connection 128, with one router connected to the network 24 using an ISDN dial backup connection 130.

With respect to the interconnection of the IVR and the carrier's voice network, dedicated inbound voice circuits/trunks are required to support client access to the IVR application. These trunks terminate calls from client callers and provide the primary access to the IVR platforms running the DNC IVR application. The following characteristics are important to the IVR application. First, the inbound trunks must provide DNIS (dialed number) data to the IVR application with every incoming call, as the IVR application passes the DNIS to the DNC servers for identification of valid client offices and access credentials. Second, the inbound trunks should provide ANI when the ANI is available. The IVR application passes the ANI to the DNC servers for tracking purposes. Lastly, the DNIS data is required to be predetermined number of digits, e.g. 10. Other characteristics of the inbound trunks are specified by the carrier and the IVR equipment supplier.

It is possible to have multiple IVR applications located at carrier switch locations that have dense numbers of DNC client offices. In these cases, trunk groups may be configured by the carrier in such a way as to allow the use of all IVR inbound trunks across all IVR applications for any local access number provided by the carrier. This configuration provides the maximum load sharing and redundancy possible within the IVR cluster.

The DNC IVR application 114 requires dedicated outbound voice circuits/trunks to allow client callers to place outgoing prospect calls as part of the DNC service. The outbound trunks must allow a consistent 10 digit dialing operation for all calls (local and long distance). The IVR application 114 may add 1+if necessary for the carrier's dialing plan. The outbound trunks allow the IVR application 114 to specify the ANI used on the outgoing call to support not only carrier billing requirements (on a station basis) but also possible future requirements forcing telemarketers to provide Caller ID information on prospecting calls. It is expected that DNC clients will spend the majority of their time bridged to outgoing calls, therefore the outgoing trunks should provide equal capacity as the incoming trunks allowing all active clients to have outgoing calls in progress simultaneously. All characteristics of the outbound trunks are the responsibility of the carrier and the IVR vendor equipment specifications. It is assumed that the carrier owns and operates the switches, the trunks between the switch and IVR, and all of the IVRs.

Referring to FIGS. 7 and 8, the DNC IVR application 114 is a custom program that runs in the IVR system 111. Its primary purpose is to provide a telephonic front end to the DNC service. The DNC IVR application 114 terminates inbound calls from a DNC client caller for access to the DNC service. It interacts with the client caller over the inbound call using DTMF input to voice responses. It communicates over an IP network to the DNC servers 122 to validate client/caller credentials and verify DNC status of telephone numbers. It then establishes outgoing calls to prospects of the client if the DNC status of the telephone number permits. The DNC IVR application 114 allows the client caller to enter final disposition status of calls via DTMF codes (including the addition of telephone numbers to the DNC database 106). Telemarketing agents typically access the IVR application 114 via local calls or 800 calls. The inbound call to the IVR system remains connected during the entire DNC session. The client caller may place multiple calls per IVR session.

An overview of an IVR session is as follows. An agent (DNC service client) dials a local access number specific to his/her office (e.g., Acme Widgets, Atlanta Ga.). The IVR system 111 receives the incoming call and verifies that the DNIS (dialed number) is configured and "online" in the DNC database 106 using a special link protocol (over an IP network), as will be described. The DNC Admin Center 36 supports the functionality of allowing multiple clients or client offices to use or share the same DNIS number. This functionality is required for VOIP based carrier networks that use IP as the transport for voice data. In VOIP networks, the number of IP gateways allowing access to the network is limited, therefore clients and customers share these limited gateway resources to the network. The IVR system 111 sends the DNIS number to the DNC Admin Center 36, which checks if its DNIS number is valid and shared. If the DNIS is approved by the DNC database, one of two events based on the result occurs for the calling agent. If the DNIS number is determined to be a shared number, the agent is prompted to enter their Office Code 146b (via DTMF keys).

The Office Code is verified using link protocol back to the DNC Admin Center. If the Office Code is valid or the DNIS number is not a shared number, the agent is prompted to enter the agent's PIN code 146 (via DTMF keys) verified using link protocol. If the PEN code is valid, the agent is then prompted to enter destination telephone numbers to be dialed for prospecting purposes. Before placing the outbound call, the IVR application 114 again uses link protocol to verify that the requested telephone number is permitted (e.g., verify that it is not on state, Federal or client DNC lists,-verify time zone parameters, verify agent/area code permissions, and so forth). If the Administrative Center 34 approves the destination telephone number, the IVR application 114 places an outgoing call to that number and bridges the agent's inbound call to the outbound call. At the end of the call, the agent is prompted to enter a final status code (##, #0–9) for the call.

Once the final status in entered, the IVR application again uses the link protocol to send summary information to the DNC database 106. If the final status was entered as "#0", the last dialed number will be automatically added to the agent's client DNC list. The agent is then prompted to enter the next telephone number. Once the agent has completed making a series of outbound calls, he/she hangs up, thereby disconnecting the inbound call to the IVR application 114.

The IVR application 114 uses the link protocol (interface) to the DNC database data center 106 to verify credentials and dialed numbers. In the embodiment described thus far, no outbound calls can be placed without positive acknowledgement from the DNC database data center 106, that is, the IVR application 114 makes no DNC or credential decisions locally.

As part of the DNC administrative center, there is a server that is responsible for maintaining synchronization between the different DNC applications (the IVR and call center applications). This "synchronization server" accepts socket connections from each application, receives DNC add and remove transactions, and distributes them to the other applications, using the same rapid data dispersal (RDDS) technology which is used on the call center servers. This ensures that the do-not-call information used by both applications is consistent. There are three types of data that are transferred via this method:

1) From the IVR application—When a phone number is added to a client-specific DNC list through the IVR application, the information is forwarded over a socket connection to the synchronization server, which in turn forwards the information to any call center servers that maintain the list for this specific client.
2) From the call center application—When a phone number is added or removed from a client-specific DNC list through the call center application, the DNC server at that call center which processed the transaction will forward it to the synchronization server, which, through an ODBC connection, will forward the transaction to the IVR application's DNC servers.
3) Non-client-specific adds and deletes (such as state and DMA lists), are sent from the IVR application's DNC servers to the synchronization server, which forwards them to each of the call center servers.

The synchronization server knows which DNC databases are being maintained by each of the DNC servers, so when it receives an add or delete transaction, it only forwards it to the specific machines which need to be informed.

If the synchronization server has a problem communicating with any of the DNC servers, and is therefore unable to forward a transaction to a certain machine, it will add the transaction to a file, notify a networking professional at the DNC service provider's company of the network problem, and mark the transaction to be retried later.

For the IVR application 114 to receive the i)NC service, it must be able to communicate with at least 1 one of these servers at all times. The IVR application 114 may be configured to load balance across all available servers.

The DNC IVR link protocol allows the DNC IVR application 114 to communicate with multiple DNC service gateway servers 122, for example, two, as shown, that are placed at carrier-provided collocation facilities. It is a TCP session layer application between IVR systems 111 running the IVR application front-end 114 and the DNC servers 122 on the same IP network. Each of the functions of the IVR application 114 includes a specific link protocol message that provides a standard way for the IVR application to transmit relevant information to and receive result codes from the DNC service.

The link protocol has a total of 5 possible transaction or message types: transaction code 1, corresponding to a 'Verify DNIS' message; transaction code 2, corresponding to a 'Verify PIN' message or 'Verify Office Code and Pin' for VOIP based networks; transaction code 3, corresponding to a 'Verify Number to be Called' message; transaction code 4, corresponding to a 'Report call summary data and Final Status' message; and transaction code 5, corresponding to a 'Provide Manual Add to DNC List' message.

In one embodiment, all messages or transactions from the IVR application 114 to the DNC gateway servers 122, include 13 fields of variable length separated by the Unix pipe "|" symbol. All data is character string,:and:no binary data passed. All transactions end with a "|" symbol to ensure that multiple requests stored together can be parsed easily.

It is assumed that each client caller has a specific DNIS number that terminates on the IVR system. The transaction code (transcode) 1 is a check of that DNIS number against the database in the central data center to see if the client caller is currently valid or is possibly a Call Center. Transaction code 1, which uses fields 1–6, has the following format: 'Transcode|UniqueID|Current Time-Date|Port#|10Digit DNIS|10Digit ANI'. For example, an actual transaction code 1 message might appear as '1|CC34Z43H9NN|12:35:4407042000|001|6035242214|6175551212|||||'. The DNC gateway servers 122 returns a message of the form 'UniqueID|Return Code|OutboundANI/BTN', where the Return Code is one of the following: '1' for 'DNIS/Customer OK'; '2' for 'Not OK (Not Valid)'; '3' for 'This is a Call Center (do not prompt for PIN, using ANI validation)'; and '16' for 'Signal to IVR to Switch to Next Server'.

Transaction code 2 is a validity check of the client caller's PIN number and Office number, if VOIP based network, against the database of the DNC database data center 106. This code uses seven of the 13 fields and it formed as 'Transcode|UniqueID|Current Time-Date|In Port#|10Digit DNIS|10Digit ANI|PIN Number|Office Code'. In response to this code, the DNC gateway servers 122 returns the UniqueID and a return code from among the following: '1' for 'Pin Number OK'; '2' for 'Pin Invalid (reason x)'; '3' for 'Pin Invalid' (reason y); '4' for 'Pin Invalid (reason z)'; and '16' for 'Signal to IVR to Switch to Next Server'.

Transaction code 3 is the formal "do-not-call" processing on a destination number entered by a client caller. The DNC database data center 106 can either allow the number, or disapprove the number for various reasons. The transaction code 3 specifies useful information in 8 of the 13 fields, in the format 'Transcode|UniqueID|Current Time-Date|In Port#|10Digit DNIS|10Digit ANI|PIN Number|Destination Number'. The DNC gateway servers 122, in response, returns the UniqueID and a return code from among the following options:

| | |
|---|---|
| 1 | Destination Number OK |
| 2 | Number Marked as "Do Not Call" |
| 3 | Number in Restricted to the Agent for Calling |
| 4 | Number currently in a "Time of Day" limitation |
| 5 | Reserved for future use |
| 6 | Reserved for future use |
| 7 | Possible Pin Fraud |
| 16 | Signal to IVR to Switch to Next Server |

The transaction code 4 passes all pertinent data to the database of the DNC database data center after an outbound call is completed. The transaction code 4, which uses all of the available fields, is formatted as follows:

Transcode|ApexUniqueID|Current Time-Date|In Port#|10Digit DNIS|10Digit ANI|PIN Number|Destination Number|Inbound Call Duration|Outbound Call Duration|Out Port#|CPA code|Final Status code

EXAMPLE

4|CC34Z43H9NN|12:35:44|07042000|001|6035242214|6175551212|754983|212873-9977|3644|240|12|1|0|0|

The Final Status code can be any of the following:

| | |
|---|---|
| "##" | Call complete, no "appointment set", no DNC add |
| "#0" | Call complete, no "appointment set", add called number to DNC list |
| "#1" | Call complete, "appointment set", no DNC add |
| . | |
| . | |
| . | |
| "#9" | Call complete, "appointment set", no DNC add |

The DNC gateway servers 122, in response to the transaction code 4, returns the UniqueID provided in the transaction code 4 message and a return code indicating that-the data received is 'OK', that is, is properly received and processed (code '1') or signaling to the IVR application to switch to another available DNC server (code '16'), e.g. in the event that the current DNC server has failed.

Transaction code 5 is used to add a number as a DNC to the database manually, that is, not as part of the process of placing an outgoing call. The transaction code 5 provides useful information in fields 1–8. It has the format 'Transcode|UniqueID|Current Time-Date|In Port#|10Digit DNIS|10Digit ANI|PIN Number|Destination Number'. The DNC server, in response to this code, returns the UniqueID and a return code, either '1' to indicated that the database was properly updated, '16' to signal to the IVR application to roll over to the another DNC server, '17' to indicate that the database is off-line (assumes transaction is "good" and so is treated as a '1') or '18' to indicate that the database is off-line and that the IVR application should play a "Call Technical Service" message.

Figure 9:
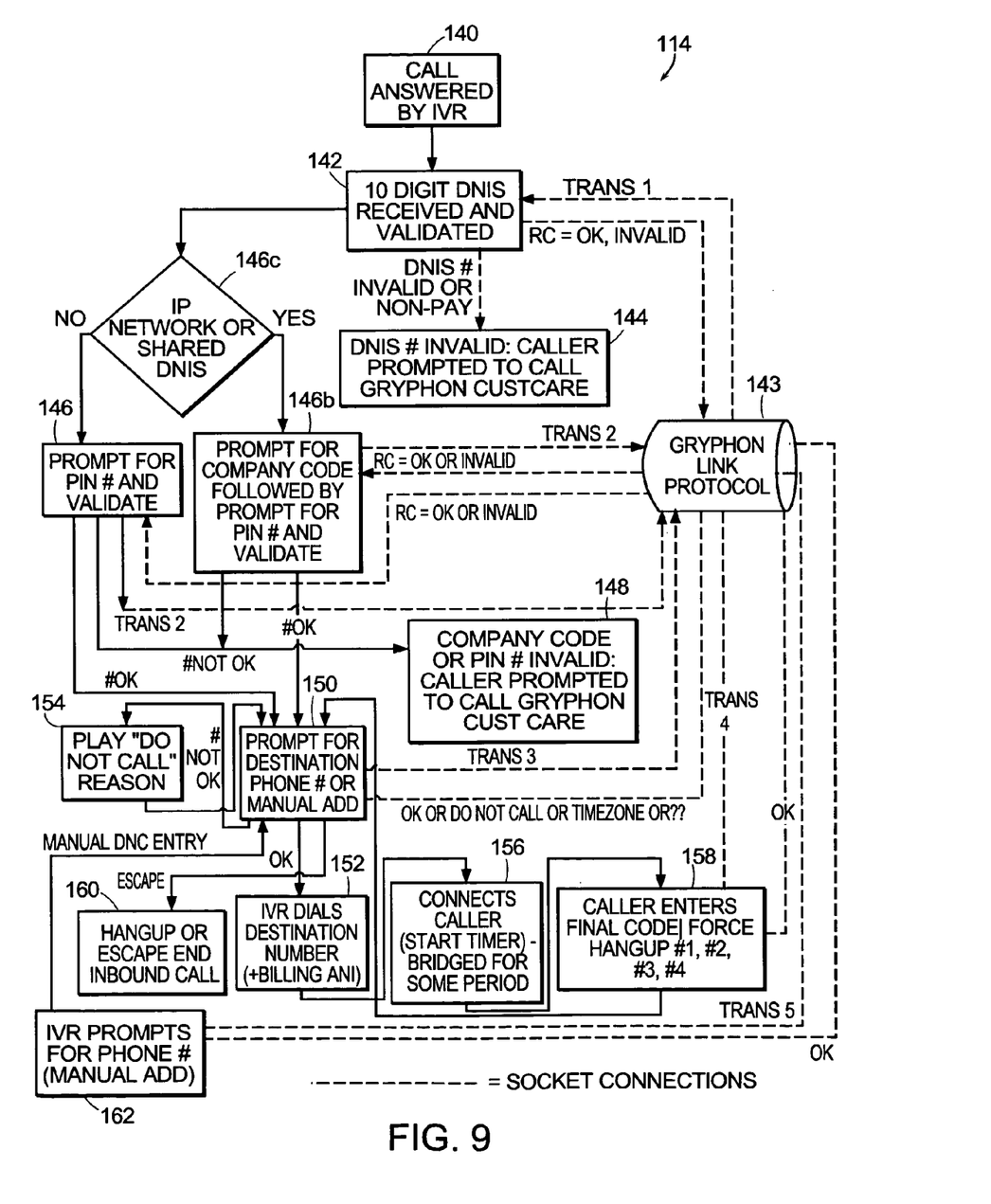
FIG. 9 is a flow diagram of an exemplary DNC call processing for IVR systems.

Referring to FIG. 9, a detailed operational flow of the DNC IVR application 114 is shown. When the IVR application receives an incoming call from a DNC client caller (step 140), it received and attempts to validate the number the DNIS (dialed number) (step 142). To validate the number, the IVR application passes the DNIS to the DNC server using the link transaction code 1 (Trans1). The interface between the IVR application 114 and the DNC gateway servers 122 (and therefore the Administrative Center 34) for this and subsequent link transaction codes is represented in the figure by link protocol 143 (indicated in dashed lines). The DNIS identifies offices on a per client basis in a "non-VoIP" network configuration. That is to say, all agents from the same office of a particular client dial the same DNIS to access the DNC IVR application and, therefore, the DNIS is only valid for one office of one client. In a VOIP based network FIG. 10, clients, as-well-as offices with the same client share the same DNIS number for access into the network. Information transmitted to the DNC gateway servers 122 in the transaction code includes the DNIS (as provided by the carrier's inbound trunk configuration) and the ANI of the inbound call to the IVR (if available). The receipt of the "Trans1" transaction by the DNC gateway servers 122 causes the DNC server to communicate with the Administrative Center 34 via the DNC service delivery network 24 to verify that the DNIS is a valid and a provisioned client or clients for VoIP DNIS. The carrier typically provides large blocks of numbers pointing to the IVR system's trunks. If the DNIS cannot be validated (step 142), that is, a failure message is returned by the DNC gateway servers 122, the IVR application 114 instructs the client caller to verify the number with the DNS service provider (step 144). If, at step 142, the DNIS is validated for the incoming call and the IVR application determines that the client caller is not a call center and the DNIS number is not sharaed, the IVR application 114 provides a voice prompt asking the client caller to enter his/her Personal Identification Number (PIN) and attempts to validate the PIN received from the client caller (step 146). The client caller enters the PIN code using DTMF keys, and presses the '#' key. (The '#' key is used at this prompt as a speed key, if the user waits after pressing the last digit, the IVR Application will timeout and use the digits collected so far as a PIN entry to validate). To validate the PIN, the IVR application 114 prepares another link transaction code, the transaction code 2 ("Trans2"), and forwards the transaction code to the DNC gateway servers 122. Key data values provided to the DNC gateway servers 122 in the transaction corresponding the transaction code 2 include the PIN provided by the client caller, the Office Code if prompted for, along with the DNIS and ANI (if available) of the inbound call.

Since the DNIS of the inbound call is unique to a particular DNC client office in a non-VoIP network, the DNC Administrative Center 34 uses it in conjunction with the PIN entered by the client caller to validate whether the client caller has provided the correct credentials to access the IVR application. The Pin Numbers are unique within a DNC client, and only valid for a particular client office. The DNC client PIN codes are established by authorized DNC administrators of the client via a web site of the DNC service provider. If the DNC gateway servers 122 returns a response indicating that the PIN entered by the client caller is invalid, the IVR application allows the client caller several more attempts to enter a correct PIN and subsequently disconnects from the inbound call if the PIN cannot be validated after the allowable number of retries (step 148).

If the IVR application receives from the DNC gateway servers 122 a response indicating that the entered PIN entered is valid, the IVR application 114 provides to the client caller a destination telephone number (the number the client caller wishes to call) request voice prompt, to which the client caller responds by either providing the destination telephone number (using DTMF keys to enter the destination telephone number and # key to indicate completion) or pressing "#0" to enter a "Manual Add" sub-function) (step 150).

When the IVR application receives the destination telephone number, it prepares a link protocol transaction code 3 (Trans3), and then passes this code to the DNC gateway servers 122. The transaction code 3 provides the DNC server with the DNIS and ANI (if available), PIN, the collected digits of the destination telephone number and the channel/card/circuit information (as available) for fraud prevention. In response to this code, the DNC gateway servers 122 checks the request destination telephone number for any restrictions, e.g., checking the number against DNC lists, such as state DNC lists, federal DNC lists, client DNC lists, as well as any time of day restrictions and agent/area code restrictions, and provides the results of the checking to the IVR application. The results indicate either that the request number can be dialled, or that the request number is somehow restricted and should not be dialled.

Based upon the results of the link transaction associated with the transaction code 3, the IVR application 114 either allows the call to proceed (and places the outbound call via a bridge to the inbound call)(step 152) or plays a message to the client caller stating a reason why the call will be blocked (step 154). If the call is dialled, the IVR application 114 starts a timer to time the duration of the bridged outgoing call (step 156).

If the outgoing call is placed, the client caller listens to call progress, speaks with the called party if the called party answers, possibly leaves a message on the answering machine of the called party or hears an IVR generated status if the call does not go through for network reasons.

At the end of a successful call (including a ring with no answer), the IVR application prompts the client caller for a final status (step 158). Calls such as SIT tones, busy, etc., also return the caller to this final status. The prompt may include a call progress indicating that that call was not answered. This final status must be entered before the client caller can be prompted to dial the next telephone number (by returning to step 150). Once the final status is entered by the client caller, the IVR application 114 uses the link transaction code 4 (Trans4) to send request as well as summary data to the DNC gateway servers 122 for delivery to the DNC Administration Center 34, which can use the summary data information for client reporting purposes.

When the final status code in the transaction code 4 indicates that the client entered a "#0" indicating that the called party asked to be placed on the client's "do-not-call" list, the Administrative Center 34 automatically adds the telephone number to the database of the DNC database data center 106.

Once a telephone number is added by a client caller via the DNC IVR application, it cannot be reversed or removed except by an client authorized administrator using the DNS service provider's web site.

The "appointment set" final status codes can be used at the discretion of the DNC client for internal reporting purposes. The use of those codes sets an "appointment" flag in the DNC call detail records. This client-defined purpose is available to DNC clients via the DNC service provider's web site.

The IVR application terminates the outgoing call immediately when the first # key is pressed during the bridged outgoing call.

If the call is blocked, the IVR application 114 again prompts the client caller to enter a destination telephone number to be called by returning to step 150. The IVR application 114 repeats step 150 until the IVR application 114 detects that the client caller has terminated the IVR session (by hanging up) (step 160).

As mentioned earlier, the client caller may, at any time during the IVR application prompt to enter the destination telephone number (at step 150), enter "#0" to be taken to a sub-function called 'Manual Add'. The 'Manual Add' allows the client caller to simply enter a 10 digit telephone number and request that it be placed on the DNC list without actually making an outgoing call. When the client caller enters the "#0" submenu function at the destination telephone number prompt, the IVR application 114 prompts the client caller for a 10 digit telephone number and performs a manual add for the number entered by the client caller (step 162). The IVR application 114 performs the manual add function by composing a link transaction code 5 (Trans5) and sending that code to the DNC gateway servers 122 for processing by the DNC Administrative Center 34.

The DNC client caller is only prompted once to enter a Manual Add telephone number. The next prompt is the main destination telephone number prompt. If more than one telephone number needs to be manually added, the client caller needs to invoke the manual add sub-menu each time with the "#0" code at the main destination telephone number prompt (step 150).

Inbound calls to the IVR system activate the DNC IVR application for all DNIS assigned to the DNC service provider. In other words, as long as the IVR application plays any message upon receipt of an inbound call (such as "Please enter your PIN" or "A technical error has occurred" or "Please verify the number you are dialing", etc.), then the carrier's IVR configuration is working for inbound calls. Properly formatted destination telephone numbers cause calls to be placed on the outbound trunks at all times. As long as the DNC IVR application is presenting 10 digit (or 1+10 depending on carrier configurations) numbers for outbound calls, the call is attempted by the carrier's switch.

Note that do-not-all updates can originate from the following three different sources, namely, a telemarketing professional using a predictive dialer; a telemarketing professional using an IVR application; and the DNC Administrative Center.

In the predictive dialer case, the update first appears in one of the DNC servers located at the customer site. The configuration file for the synchronization module is configured to send the update to another co-located server box at the customer site, and to the synchronization server machine in the DNC Administrative Center. The synchronization server at the DNC Administrative Center has the unique ability to then forward the update to the IVR application databases and to other predictive dialer configurations (n–1) for the same client at other geographic locations.

In the case of the IVR applications, the IVR application automatically sends all updates to the synchronization server located in the DNC Administrative Center. That server, based on the client id, then forwards the updates to one of the DNC servers at each of the appropriate customer site(s) that employs predictive dialers. Once the DNC server at each customer predictive dialer site receives the update, it forwards the update to its fellow/co-located DNC servers at that site.

In the case of the DNC Administrative Center, when new state or dma database changes are made at the Administrative Center, these changes are forwarded to the synchronization server, which in turn forwards them to one of the DNC servers at each customer site. Once the DNC server at each customer site receives the update, it forwards the update to its fellow DNC servers at that site.

Other embodiments are within the scope of the following claims.

What is claimed is:

1. A method of disseminating caller-related information in a do-not-call system that includes a plurality of automatic dialer systems each at a corresponding different one of a plurality of different locations, each of said plurality of automatic dialer systems including an associated database system that is local to that automatic dialer system and that stores a do-not-call list, said method implemented by a given one of the automatic dialer systems and comprising:

receiving an update instruction, said update instruction being a first type or a second type, said first type for blocking future calls to a specified telephone number and said second type for removing a block on future calls to a specified telephone number;

in response to receiving said update instruction, concurrently sending a first update notification and a second update notification, wherein said first update notification is sent to the local database system and said second update notification is sent to another one of said plurality of automatic dialer systems that is located elsewhere from said given one of the automatic dialer systems; and     in response to receiving said first update notification at said local database system associated with said given one of the automatic dialer systems, updating the do-not-call list stored therein, wherein the second update notification is for causing an update of the do-not-call list at said another one of said plurality of automatic dialer systems.

2. The method of claim 1 further comprising, in response to receiving said update instruction and before concurrently sending said first and second update notifications, verifying that a first token associated with the received update instruction requires that said another one of said automatic dialer systems be updated and wherein the second update notification includes a second token for indicating whether said another one of said automatic dialer systems needs to forward an update notification to yet another one of said automatic dialer systems.

3. The method of claim 2 wherein the first token is a count variable and wherein the verifying involves decrementing the count variable and then confirming that the count variable is different from a predetermined value.

4. The method of claim 3 wherein the second token is the decremented value of the count variable.

5. The method of claim 1 further comprising, after receiving said update instruction and prior to sending the second update notification, retrieving from a configuration file that is local to said given one of the automatic dialer systems an address for said another one of said automatic dialer systems and wherein the sending of the second update notification is to the retrieved address.

6. The method of claim 1 further comprising generating said update instruction locally to said given one of the automatic dialer systems.

7. The method of claim 1 wherein the received update instruction is received from an entity that is remote from said given one of the automatic dialer systems.

8. A method of processing call information for calls to be placed by a plurality of automatic dialer systems deployed at different geographic locations within a communications network, said method comprising:

maintaining a plurality of copies of a Do-Not-Call (DNC) list, each copy of which is associated with a different one of the plurality of automatic dialer systems;

receiving at a first automatic dialer system call information for a number to be called by said first automatic dialer systems;

processing the call information to determine if the number is on list;

if the number is determined not to be on the DNC list, determining if the number is to be added to the DNC list; and     if the number is to be added to the DNC list, concurrently sending a first update notification for updating the copy of the DNC list associated with said first automatic dialer system and a second update notification to a different one of the plurality of dialer systems for causing an update of the copy of the do-not-call database associated with said different one of the automatic dialer systems.

9. The method of claim 1, wherein the plurality of automatic dialer systems comprise a plurality of predictive dialers.

10. The method of claim 8, wherein the plurality of automatic dialer systems comprise predictive dialers.

* * * * *